United States Patent
Hwang et al.

[11] Patent Number: 5,832,101
[45] Date of Patent: Nov. 3, 1998

[54] DEVICE AND METHOD FOR DETECTING A MOTION VECTOR OF AN IMAGE

[75] Inventors: Jung-Hyun Hwang; Yong-Cheol Park, both of Seoul, Rep. of Korea

[73] Assignee: Samsung Electronics Co., Ltd., Kyungki-Do, Rep. of Korea

[21] Appl. No.: 712,608

[22] Filed: Sep. 13, 1996

[30] Foreign Application Priority Data

Sep. 19, 1995 [KR] Rep. of Korea ............ 95-30793

[51] Int. Cl.⁶ .................................. G06K 9/00
[52] U.S. Cl. ................. 382/107; 348/416; 382/278
[58] Field of Search ........................ 382/199, 263, 382/200, 107, 266, 278; 348/416

[56] References Cited

U.S. PATENT DOCUMENTS

| | | | |
|---|---|---|---|
| 4,884,136 | 11/1989 | Ninomiya et al. | 348/701 |
| 5,111,511 | 5/1992 | Ishii et al. | 382/107 |
| 5,157,742 | 10/1992 | Niihara | 382/236 |
| 5,172,226 | 12/1992 | Morimura et al. | 348/208 |
| 5,184,216 | 2/1993 | Kobayashi | 348/208 |
| 5,317,685 | 5/1994 | Morimura et al. | 345/474 |

*Primary Examiner*—Joseph Mancuso
*Assistant Examiner*—Martin E. Miller
*Attorney, Agent, or Firm*—Sughrue, Mion, Zinn, Macpeak & Seas, PLLC

[57] ABSTRACT

A device and method for detecting a motion vector of an image. The device comprises a horizontal edge extractor, a one-line accumulator, a delay register, a vertical line memory, a sign decision memory, a vertical correlation arithmetic unit, a horizontal edge extractor, a first horizontal line memory, a second horizontal line memory, a comparator, and a horizontal correlation arithmetic unit. Directional edges are used to enhance the accuracy of a motion vector. Since correlation values are calculated as soon as a scan is completed for a field image, it is possible to detect a motion vector at high speed. The device realizes a simple circuit by economizing memory.

11 Claims, 8 Drawing Sheets

DEVICE AND METHOD FOR DETECTING A MOTION VECTOR OF AN IMAGE

BACKGROUND OF THE INVENTION (1) Field of the Invention The present invention relates to a device and method for detecting a motion vector of an image. More specifically, the present invention relates to a device and method for correcting an unstable image of a video camera caused by unstable hands.

(2) Description of the Prior Art The detection of a motion vector from a dynamic image signal is an essential technique in the compression, recognition, and stabilization of an image.

When a portable video camera united with a VCR (videocassette recorder), which is in popular use, is used to take a picture, especially by a user who is walking or on a vehicle, an image input to the camera is likely to be unstable. In addition, when a picture is highly magnified in a camcorder, the stability of an image is further deteriorated by unstable hands.

A solid state pick-up device is widely used as an input device of a camcorder.

The solid state pick-up device is an image pickup device made from a semiconductor chip which does not use electron beams. There are two types of solid-state pick-up devices—a MOS type which uses a metal oxide semiconductor (MOS) transistor in a light receiver, and a CCD type (a charge coupled device).

The following are relevant references.

A. U.S. Pat. No. 5,184,216
  Application Date: Feb. 2, 1993
  Title: Image Sensing Apparatus Having Camera-Shake Detecting Function B. IEEE Trans. Consumer Electronics, Vol 36, No. 3
  Publication Date: Aug., 1990
  Title: Electronic Image Stabilizer for Video Camera Use In the following, an image correction system according to the prior art will be explained.

As shown in FIG. 1, a conventional image correction system for the purpose of stabilizing an image comprises:

- a CCD imager 10 (a solid state pick-up device) which picks up an input image in a solid state device through an optical system, scans the image electronically within the solid state device, and converts the image into an electric signal to be output;
- an analog/digital converter 20 (referred to as a A/D converter hereinafter) which converts an analog signal output from said CCD imager 10 into a digital signal to be output;
- a camera signal processing unit 30 which converts a signal output from the A/D converter 20 into a color and brightness signal to be output;
- a motion vector detecting unit 40 which, from a signal output from the A/D converter 20, detects motion caused by unstable hands to output a motion vector;
- a memory control unit 50 which receives a motion vector output from the motion vector detecting unit 40 to control the location of an area to be corrected;
- a field memory 60 which holds a field unit (or a frame unit) of image data output from the camera signal processing unit 30 and, according to the image correction control by the memory control unit 50, outputs a stabilized image signal; and
- a digital/analog converter 70 (referred to as a D/A converter hereinafter) which converts a digital image signal output from said field memory 60 into an analog image signal to be output.

In such an image correction system, correlation values are calculated between image data selected out of an image which is continuous in time, and a motion vector is determined from the point where the minimum correlation value results.

Generally, a block matching algorithm is widely used to calculate the correlation value. In order to solve the problems of calculative complexity and real-time processing, it has already been suggested to use various techniques such as pyramid search, logarithmic search, and so on. A two-dimensional block matching algorithm, however, entails a rapid increase in the number of arithmetic operations with an increase in the number of pixels to be considered. On the other hand, when the number of pixels to be considered is decreased, the algorithm is likely to produce erroneous results such as a local minimum in which only a local area is stabilized.

As shown in FIG. 2, a general method has also been used which one-dimensionally abstracts and corrects motion data throughout all the area by projecting an image pattern.

After an image pattern has been projected in the direction of horizontal and vertical axes, the projection result is compared with the projection result of the preceding image pattern to calculate correlation values between them. A displacement quantity between the two fields is estimated from the point where the minimum correlation value results. x and y represent horizontal and vertical axes of coordinates, respectively, of a field image. Assuming that M is the number of horizontal pixels of an image, and that N is the number of lines of an image, such correlation values can be calculated by the following equations:

$$C_H(u) = \sum_{x=S_H}^{M-S_H} |P'_H(x+u) - P_H(x)| \tag{1}$$

$$C_V(v) = \sum_{y=S_V}^{M-S_V} |P'_V(y+v) - P_V(y)| \tag{2}$$

In the equations, $P'_H$ and $P_H$ are line memories for detecting a horizontal motion vector, in which the preceding and the present image data are projected, respectively, in the direction of the horizontal axis X. Similarly, $P'_V$ and $P_V$ are line memories for detecting a vertical motion vector, in which the preceding and the present image data are projected, respectively, in the direction of the vertical axis Y. u and v $\{(u, v)|-S_H<u<S_H, -S_V<v<S_V\}$ are integers within horizontal and vertical searching areas $\pm S_H$ and $\pm S_V$, respectively, and they represent displacement variables.

As shown in the equations (1) and (2), in each definition area, if variables u and v represent the minimum quantities among the sums of the differences between the projection values of the preceding field and of the present field, the variables u and v are considered to be the optimum displacement quantity of an image.

As compared with a two-dimensional matching algorithm, such a one-dimensional signal matching algorithm enables us to get a motion vector in fewer number of arithmetic operations than the two-dimensional matching algorithm, even when there is a large motion of an image.

The one-dimensional signal matching algorithm, however, has the following problems.

First, it has a time restriction that the calculation of correlation should be finished before the raster scanning of the next field begins, since the projection of the present image data is completed when the raster scanning of an input image comes to an end point.

Further, an input pixel should be converted into a low-quantized level (a binary signal, etc.) in order to economize the projection memory.

Also, the determination of a threshold value in the conversion of pixels into a binary signal, a processing method through the abstraction of contours of an image and so on, can lead to the loss of some pixel data.

In addition, two pairs of line memories are required, of which one pair corresponds to N, the number of lines of an input image, and the other one to M, the number of horizontal pixels, and, accordingly, a complex calculating algorithm is required. Assuming that an image is input as a binary signal, and that the number of data bits of a memory cell in each line memory is $d_M$ (the least integer larger than $\log_2 M$) and $d_N$ (the least integer larger than $\log_2 N$), the memory size required for each projection line memory is $2M \cdot d_N$ bits for horizontal data, and $2N \cdot d_M$ bits for vertical data. Accordingly, assuming that the effective limits of searching areas are $\pm S_H$ and $\pm S_V$, the number of arithmetic operations is $(M-2S_H) \cdot (2S_H+1)$ of comparison, and addition or subtraction for $d_N$ bits of horizontal data, and $(N-2S_V) \cdot (2S_V+1)$ for $d_M$ bits of vertical data, so that a great number of arithmetic operations, and line memories of big memory size are required.

SUMMARY OF THE INVENTION

It is therefore an object of the present invention to solve the above problems by providing a device and method for detecting a motion vector of an image, in which directional edges are used to enhance the accuracy of a motion vector, an arithmetic circuit is simplified with line memories economized, and a motion vector is detected at a high speed.

In order to attain the above object, a motion vector detecting device according to an embodiment of the present invention comprises:

a horizontal edge extractor which extracts and outputs horizontal edges from an input image;

a one-line accumulator which is reset by a one-line reset signal from a controller and accumulates horizontal edges input from the horizontal edge extractor, then outputs accumulated data corresponding to one line of pixels;

a delay register which holds line data input from the one-line accumulator for a given time, then outputs the line data;

a vertical line memory which stores the accumulation data of the preceding field before replacing the data with line data input from the delay register;

a sign decision memory which is reset by a one-line reset signal from a controller, stores data input from the vertical line memory and, from the value stored in every cell, subtracts a value input from the horizontal edge extractor to output the subtracted values;

a vertical correlation arithmetic unit which is reset by a one-field reset signal from a controller, holds correlation values and, according to a value input from each cell of the sign decision memory, increases or decreases the corresponding correlation value to detect and output a vertical motion vector;

a vertical edge extractor which extracts and outputs vertical edges from an input image;

a first horizontal line memory which stores and outputs the accumulation values of pixel data input from the vertical edge extractor;

a second horizontal line memory which dispersedly stores the accumulation values of the preceding field and replaces the stored values with data input from the first horizontal line memory;

a comparator which receives accumulation values from the first and second horizontal line memories and compares the values to output a comparison result; and a horizontal correlation arithmetic unit which holds correlation values and, according to the comparison result of the comparator, increases or decreases the correlation values to detect and output a horizontal motion vector.

In order to attain the above object, a method for detecting a horizontal motion vector according to an embodiment of the present invention comprises the steps of:

initializing correlation values;

clearing the first horizontal line memory;

extracting a vertical edge;

accumulating the partial-accumulation value of the present field into the first horizontal line memory;

comparing the accumulation values of the first and second horizontal line memories, increasing or decreasing horizontal correlation values;

renewing the data of the second horizontal line memory;

deciding whether there is any image division left where correlation values are to be compared;

setting the next division in order to return the step of clearing the first horizontal line memory, in case that there is any image division left; and detecting the minimum value out of the correlation values to output a horizontal motion vector, in case that there is no image division left.

In order to attain the above object, a method for detecting a vertical motion vector according to an embodiment of the present invention comprises the steps of:

initializing correlation values;

setting up the sign decision memory;

preloading the correlation values;

extracting a horizontal edge;

deciding whether there is any horizontal edge extracted in the preceding step;

deciding whether calculation is completed up to the last pixel of the current line, in case there is no horizontal edge extracted;

decreasing the value of every cell of the sign decision memory by a given value, in case there is a horizontal edge extracted;

deciding whether the value of a cell of the sign decision memory is positive;

decreasing a correlation value by a given value, in case the value of the corresponding cell of the sign decision memory is positive;

increasing a correlation value by a given value, in case the value of the corresponding cell of the sign decision memory is not positive;

deciding whether every cell of the sign decision memory has been checked on;

setting the next cell to be checked on, in case every cell of the sign decision memory has not been checked on;

deciding whether calculation is completed up to the last pixel of the current line, in case every cell of the sign memory has been checked on;

setting the next pixel in order to return to the step of detecting a horizontal edge, in case calculation is not completed up to the last pixel of the current line;

deciding whether calculation is completed up to the last line, in case calculation is completed up to the last pixel of the current line;

setting the next line in order to return to the step of setting up the sign decision memory, in case calculation is not completed up to the last line; and detecting the minimum value out of the correlation values to output a vertical motion vector, in case calculation is completed up to the last line.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

In the following, a preferred embodiment of the present invention will be described in detail in conjunction with the accompanying drawings.

Figure 4:
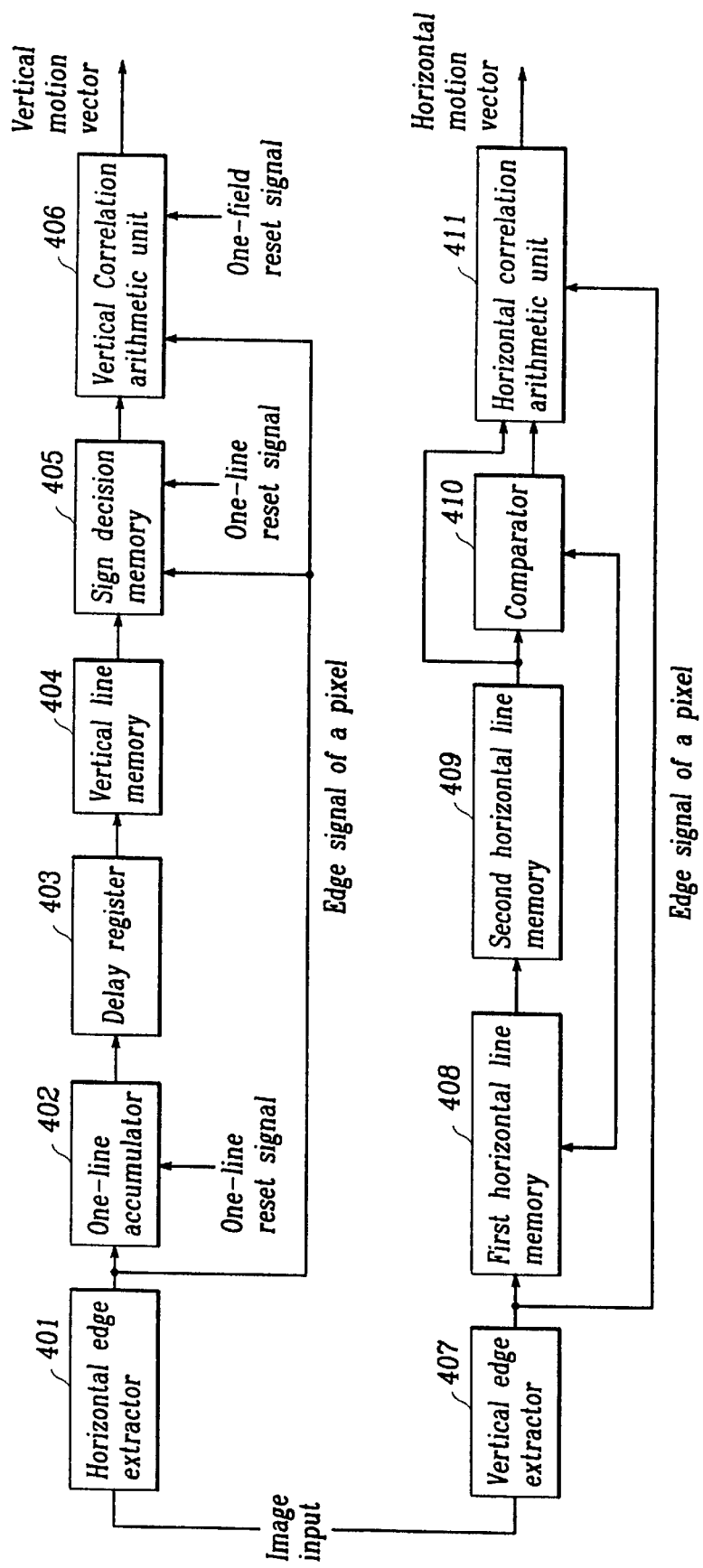
FIG. 4 is a block diagram which shows a device for detecting a motion vector according to an embodiment of the present invention.

FIG. 4 is a block diagram which shows a device for detecting a motion vector according to an embodiment of the present invention. As shown in FIG. 4, the device includes a horizontal edge extractor 401 which extracts and outputs horizontal edges $E_x(x,y)$, a one-line accumulator 402 which is reset by a one-line reset signal from a controller (not shown), and which accumulates horizontal edges input from the horizontal edge extractor 401, and outputs accumulated data corresponding to one line of pixels. A delay register 403 holds line data input from the one-line accumulator 402 for a time during which lines corresponding to half a vertical searching area are scanned, and outputs the line data. A vertical line memory 404 stores the accumulation data of the preceding field before replacing the data with line data input from the delay register 403, and a sign decision memory 405, which is reset by a one-line reset signal from a controller (not shown), stores data input from the vertical line memory 404 and, from the value stored in every cell, subtracts a value input from the horizontal edge extractor 401 to output the subtracted value.

A vertical correlation arithmetic unit 406, which is reset by a one-field reset signal from a controller (not shown), holds correlation values and, according to a value input from the sign decision memory 405, increases or decreases the corresponding correlation value to detect and output a vertical motion vector.

The device further includes a vertical edge extractor 407 which extracts and outputs vertical edges from an input image, a first horizontal line memory 408 which stores and outputs the accumulation values of pixel data input from the vertical edge extractor 407, a second horizontal line memory 409 which dispersedly stores the accumulation values of the preceding field and replaces the stored value with data input from the first horizontal line memory 408. A comparator 410 receives accumulation values from the first and second horizontal line memories 408 and 409 and compares the values to output a comparison result, and a horizontal correlation arithmetic unit 411 holds correlation values and, according to the comparison result of the comparator 410, increases or decreases the correlation values to detect and output a horizontal motion vector.

Figure 7:
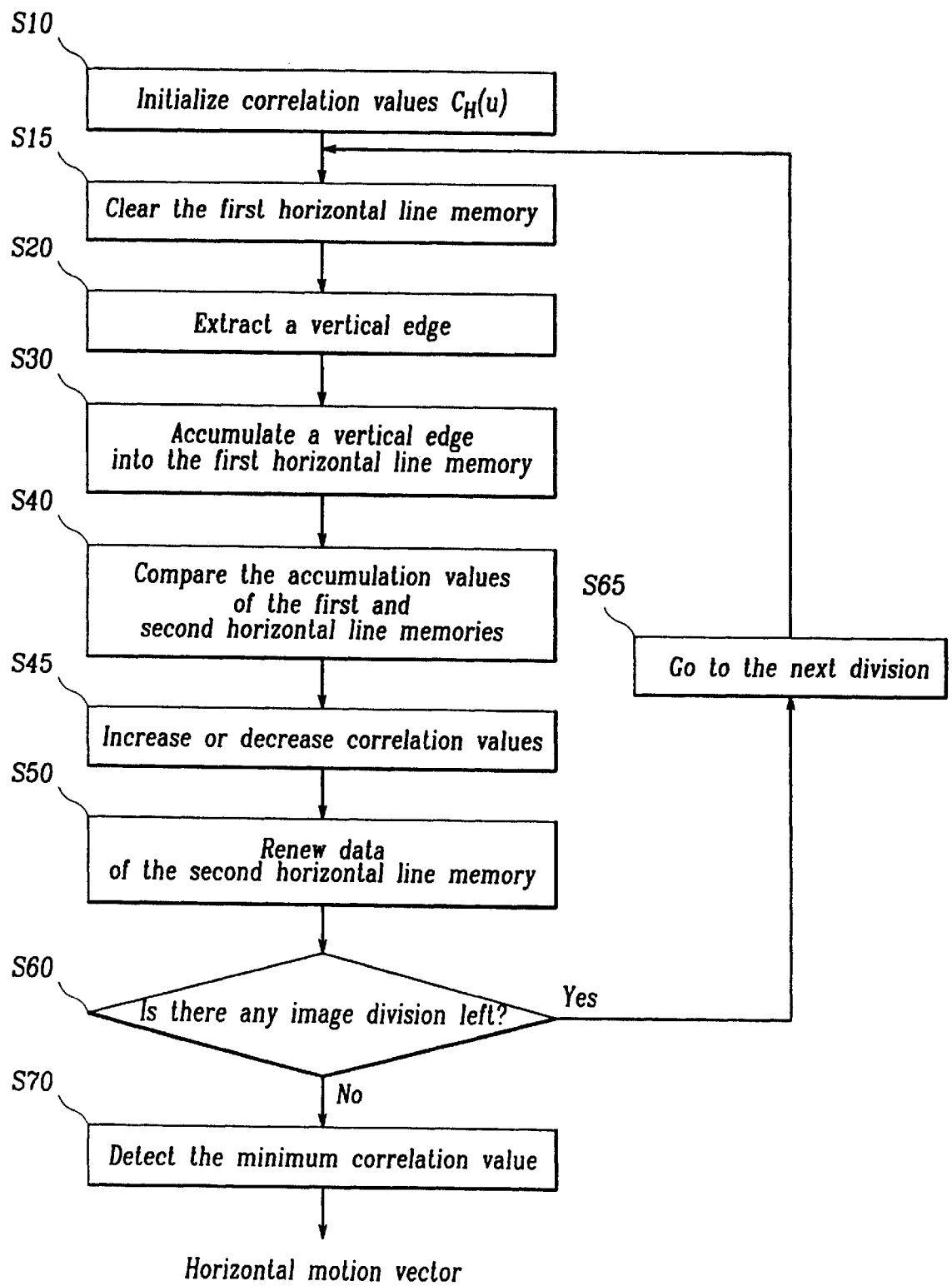
FIG. 7 is a flowchart which shows a method for detecting a horizontal motion vector according to an embodiment of the present invention.

FIG. 7 is a flowchart which shows a method for detecting a horizontal motion vector according to an embodiment of the present invention. As shown in FIG. 7, the method includes the steps of initializing the correlation values $C_H(u)$ in the horizontal correlation arithmetic unit 411 (S10), clearing the first horizontal line memory 408 (S15), extracting a vertical edge $E_y(x, y)$ through the vertical edge extractor 407 (S20), accumulating the partial-accumulation value of the present field into the first horizontal line memory 408 (S30), comparing, in the comparator 410, the partial-accumulation values of the present and preceding fields, respectively, in the first and second horizontal line memories 408 and 409 (S40), increasing or decreasing horizontal correlation values in the horizontal correlation arithmetic unit 411, according to the output of said comparator 410 (S45), renewing the data of the second horizontal line memory 409 (S50), deciding whether there is any image division left where correlation values are to be compared (S60), setting the next division in order to return the step of clearing the first horizontal line memory 408, in case that there is any image division left (S65), and detecting, in the horizontal correlation arithmetic unit 411, the minimum value out of the correlation values to output a horizontal motion vector, in case that there is no image division left (S70).

Figure 8:
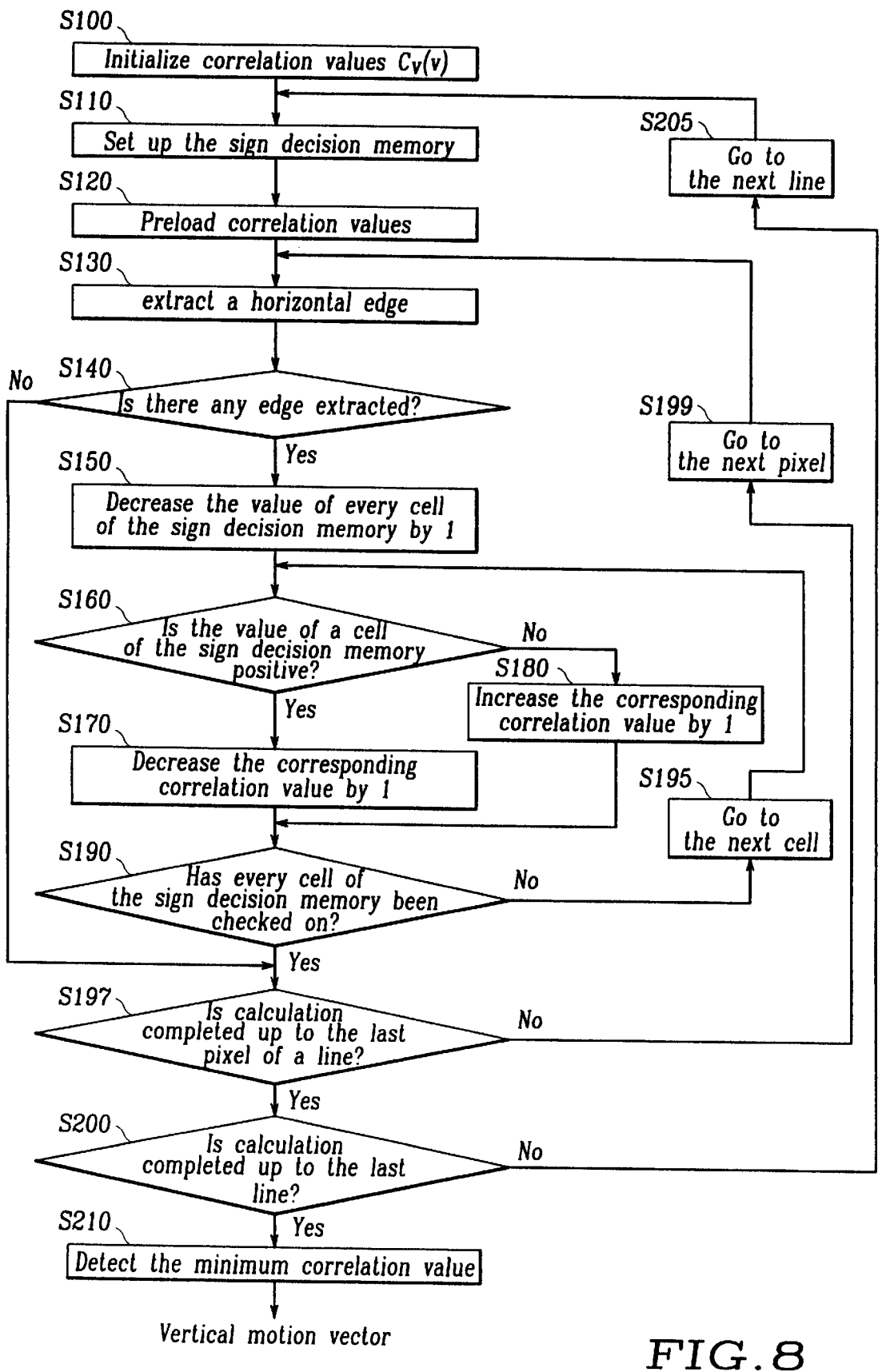
FIG. 8 is a flowchart which shows a method for detecting a vertical motion vector according to an embodiment of the present invention.

FIG. 8 is a flowchart which shows a method for detecting a vertical motion vector according to an embodiment of the present invention. As shown in FIG. 8, the method includes the steps of initializing the correlation values $C_v(v)$ of the vertical correlation arithmetic unit 406 (S100), setting up, into the sign decision memory 405, the accumulation values of the preceding field within a searching area centering around a line to be scanned (S110), preloading, into the vertical correlation arithmetic unit 406, the correlation values of the preceding field within a searching area centering around a line to be scanned (S120), extracting a horizontal edge $E_x(x, y)$ through a horizontal edge extractor 401 (S130), deciding whether there is any horizontal edge extracted in the preceding step (S140), deciding whether calculation is completed up to the last pixel of the current line when there is no horizontal edge extracted (S197).

The method further includes the steps of decreasing the value of every cell of the sign decision memory 405 by 1 when a horizontal edge has been extracted (S150), deciding whether the value of a cell of the sign decision memory 405 is positive (S160), decreasing a correlation value by 1 when the value of the corresponding cell of the sign decision memory 405 is positive (S170), increasing a correlation value by 1 when the value of the corresponding cell of the sign decision memory 405 is not positive (S180), deciding whether every cell of the sign decision memory 405 has been checked (S190), setting the next cell to be checked when every cell of the sign decision memory 405 has not been checked on (S195), deciding whether calculation is completed up to the last pixel of the current line, when every cell of the sign memory has been checked on (S197), setting the next pixel in order to return to the step of extracting a horizontal edge when calculation is not completed up to the last pixel of the current line (S199), deciding whether calculation is completed up to the last line when calculation is completed up to the last pixel of the current line (S200). The next line is set to return to the step (S110) of setting up the sign decision memory when calculation is not completed up to the last line (S205), and a minimum value out of the correlation values is detected to output a vertical motion vector when calculation is completed up to the last line (S210).

In the following, a preferred embodiment of the present invention will be described in conjunction with the accompanying drawings.

Generally, as compared with brightness data of an image, edge components of an image are characterized by their economization on memory, insusceptibility to changes in brightness of a whole image, and ease in determining a threshold value for binary conversion. A method for detecting a motion vector according to an embodiment of the present invention is a matching algorithm for one-dimensional accumulation values of directional edge components of an image. In this method, in order to eliminate noise and unnecessary edges, and to maximize correlations, horizontal and vertical edges are extracted from an image and are accumulated, respectively, in horizontal and vertical line memories.

Figure 1:
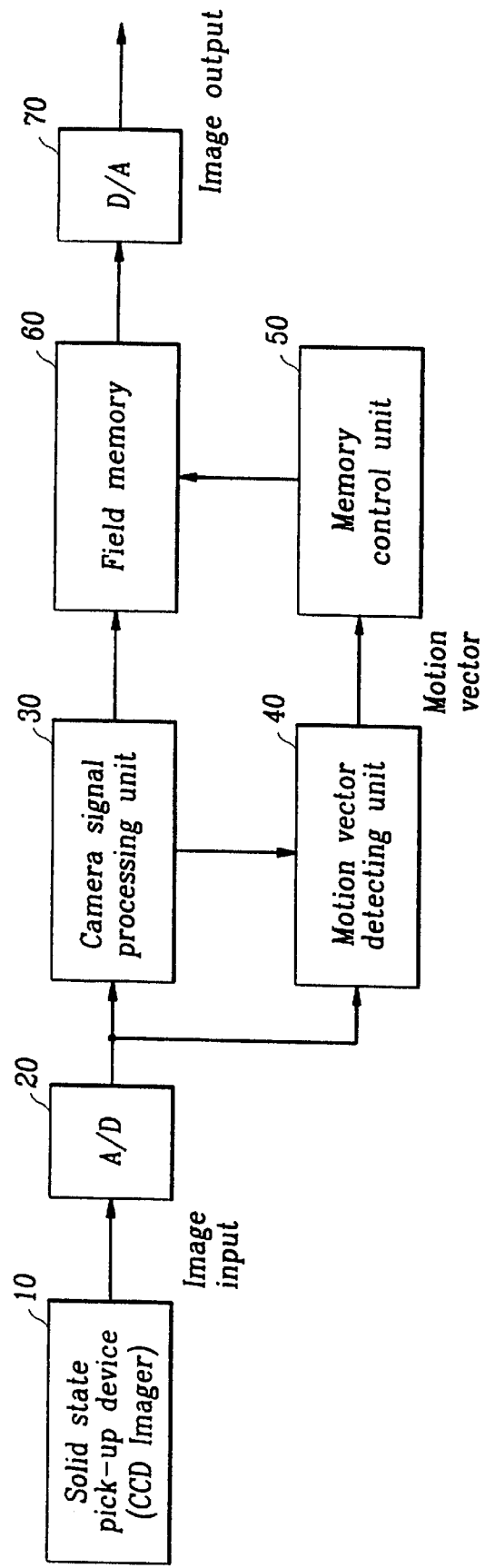
FIG. 1 is a block diagram which shows a conventional image correction system.
Figure 2:
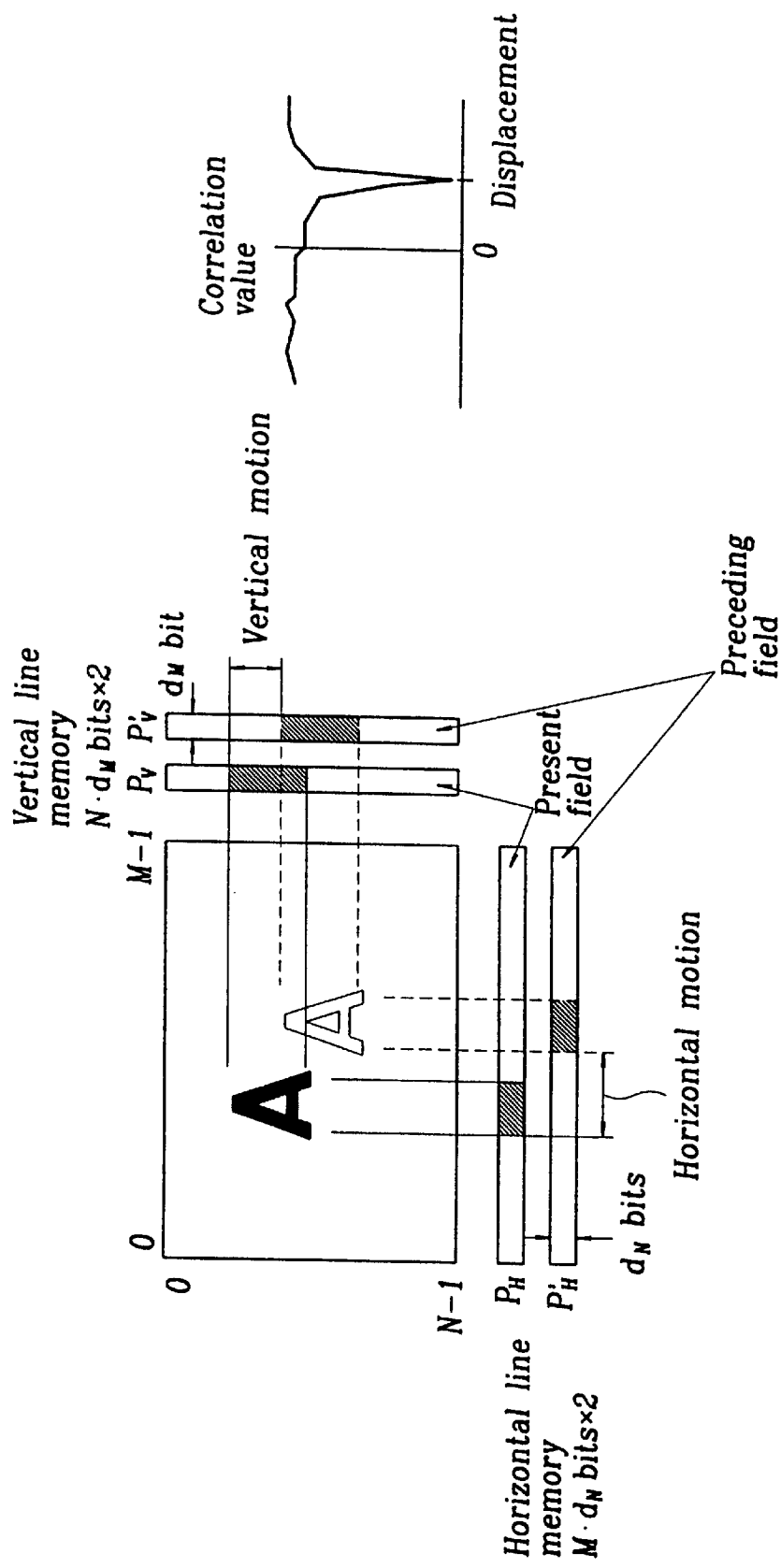
FIG. 2 is a conceptual diagram which shows a conventional method of one-dimensionally detecting a motion vector of an image.
Figure 3:
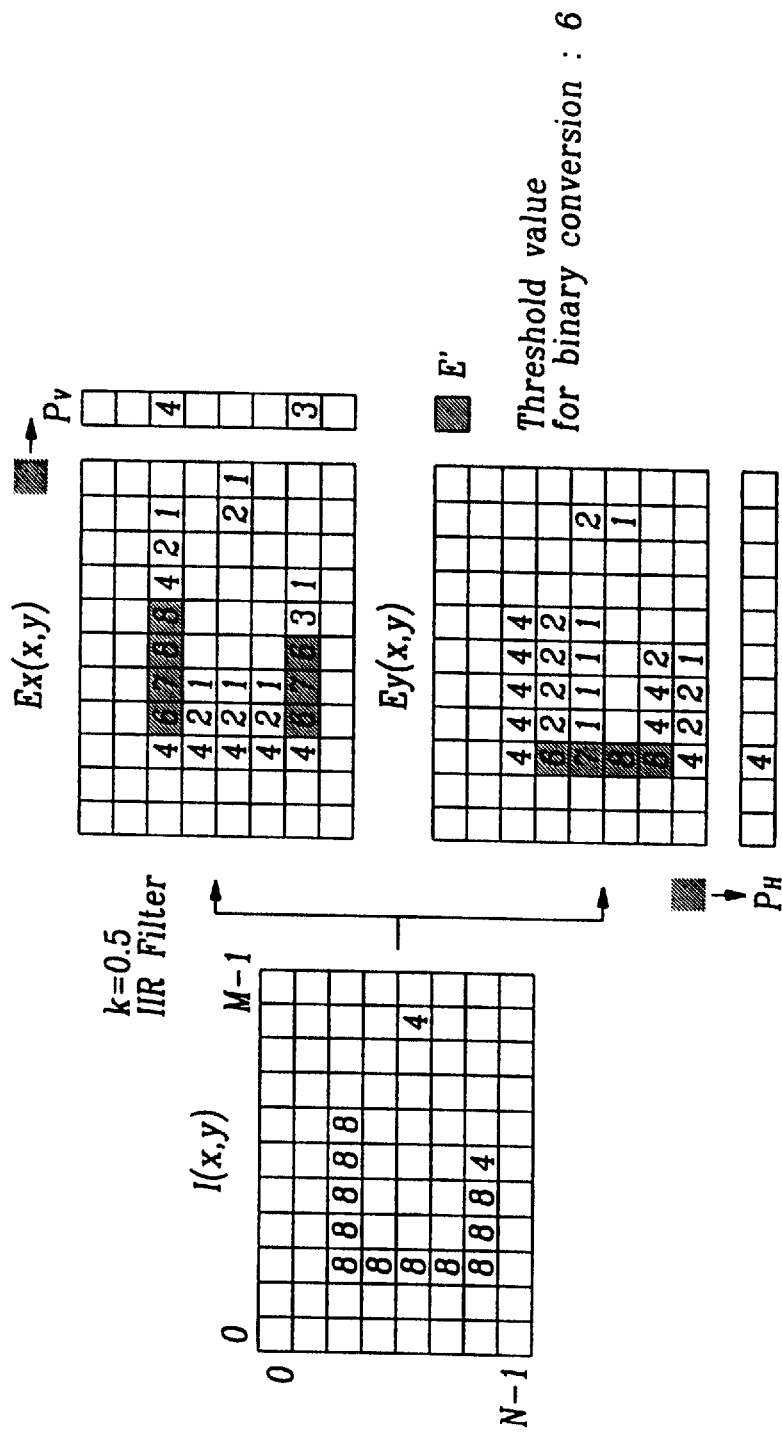
FIG. 3 is a conceptual diagram which shows a method for extracting horizontal and vertical edge components using an IIR filter according to an embodiment of the present invention.

FIG. 3 is a conceptual diagram which shows a method for extracting horizontal and vertical edge components using an infinite impulse response filter (referred to as IIR filter hereinafter) according to an embodiment of the present invention. It shows an accumulation method through an IIR filter from an edge image according to the spacial differences of an image.

As shown in FIG. 3, the extraction of each directional edge is carried out through an IIR filter, and each directional edge is represented by the following equations (3) and (4).

$$E_x(x,y)=k(I(x,y)-I(x,y-1))+(1-k)E_x(x-1,y) \quad (3)$$

$$E_y(x,y)=k(I(x,y)-I(x-1,y))+(1-k)E_y(x,y-1) \quad (4)$$

In the above equations, I(x,y) is the brightness of a pixel at the coordinates (x, y), E(x,y) is an output through the IIR filter, and k is a real number between 0 and 1. The smaller k is, the more continuous a direction edge signal is.

E'(x,y) is a binary signal which is converted from E(x,y) by a proper threshold value, and is used in detecting a motion vector.

A method for detecting a motion vector according to an embodiment of the present invention includes a difference between horizontal motion and vertical motion.

First, a method for detecting a vertical motion vector is described in conjunction with relevant equations and with a device for detecting a motion vector.

The following equation (5) can substitute for the equation (2) in calculating a correlation value.

$$C_V(v) = \sum_{y=S_V}^{N-S_V} |P'_V(y + v) - \sum_{x=0}^{M-1} E'_x(x,y)| \quad (5)$$

In the equation, v $\{v|-S_v \leq v \leq S_v\}$ is a displacement variable within a searching area $\pm S_v$. A variable v, which makes the minimum value of $C_v(v)$, is the optimum motion vector. $E'_x(x,y)$ is the horizontal edge data at the coordinates (x, y). To integrate or accumulate $E'_x(x,y)$ from x=0 to x=M−1, it will be $P_x(y)$, an accumulation value in a horizontal line through (x, y) (referred to as a line y hereafter). In other words, a correlation value between field images in a line y is the absolute value of a difference between a line integration value of $E'_x(x,y)$ and an accumulation value of the preceding field $P'_v(y+v)$. Thus, if the line integration value is less than the accumulation value of the preceding field, a subtracted value from the accumulation value is a correlation value; otherwise, an excess value over the accumulation value is a correlation value in a line y.

In order to realize the above, equation (5) can be expressed like the following equation (6)

$$C_V(v) = \sum_{y=S_V}^{N-S_V} \left( P'_V(y + v) - \sum_{x=0}^{m-1} E_x(x,y) + \sum_{x=m}^{M-1} E_x(x,y) \right) \quad (6)$$

In the equation, a threshold value m is an integer that meets the following equation (7).

$$\sum_{x=0}^{m-1} E_x(x,y) = P'_V(y + v), (0 < m < M) \quad (7)$$

If there is no integer that meets equation (7), M is used instead. Consequently, when the second term on the right side of equation (5) is less than the accumulation value P'v(y+v) of the preceding field, the third term on the right side of equation (7) will be 0. However, when the second term on the right side of equation (5) is equal to or greater than the accumulation value of the preceding field, a correlation value in a line y will be the absolute value of a difference between the first and second terms on the right side of equation (5).

As shown in FIG. 4, a device for detecting a motion vector according to an embodiment of the present invention comprises a device for detecting a vertical motion vector 401~406 and a device for detecting a horizontal motion vector 407~411.

Assuming that an input image signal is a binary converted signal and a field image has 240 lines by 720 pixels, and that the output is a vertical motion vector, the device for detecting a vertical motion vector 401~406 comprises a horizontal edge extractor 401, a vertical line memory 404 (240 cells * 10 bits) for accumulating a field image, a one-line accumulator 402 (1 * 10 bits), a delay register 403 ($S_v$ cells * 10 bits), a sign decision memory 405 (($2S_v$+1) cells * 10 bits), and a vertical correlation arithmetic unit 406 (($2S_v$+1) cells * 16 bits).

Figure 5:
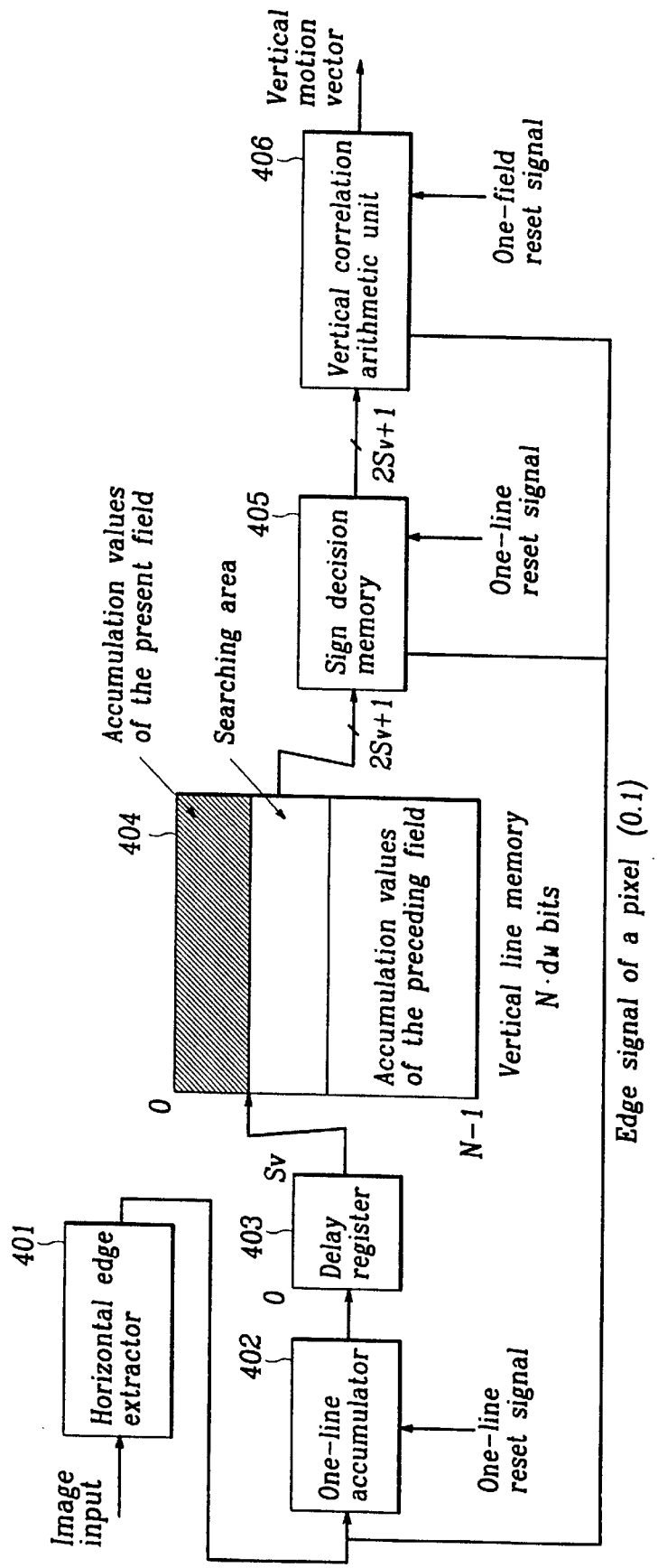
FIG. 5 is a conceptual diagram which shows a method for detecting a vertical motion vector according to an embodiment of the present invention.

A method for detecting a vertical motion vector will be described with reference to FIG. 5 and FIG. 8.

First, the correlation value $C_v(v)$ in the vertical correlation arithmetic unit 406 is initialized (S100).

Before some line y is scanned, the accumulation values $P'_v(y-S_v) \sim P'_v(y+S_v)$ of the preceding field within a searching area centering around the line to be scanned are accumulated into the sign decision memory 405 and the vertical correlation arithmetic unit 406, then the first term on the right side of equation (6) is determined (S100 and S120). In this case, the number of cells to be accumulated into, in the sign decision memory 405 and the vertical correlation arithmetic unit 406, is $2S_v$+1, which is the length of a searching area.

Next, a horizontal edge $E_x(x,y)$ is extracted through a horizontal edge extractor 401 (S130).

A decision is made whether there is any horizontal edge extracted, that is, whether the value of a pixel read through a line scan is "1" (S140).

If there is no horizontal edge detected, that is, the value of a pixel read is "0", a decision is made whether calculation is completed up to the last pixel of the current line (S197).

If there is any horizontal edge extracted, the value of every cell of the sign decision memory 405 is decreased by 1 (S150).

Then, a decision is made whether the value of the vth cell of the sign decision memory 405 is positive or negative.

If the value of the vth cell is positive, a correlation value $C_v(v)$ is decreased by 1 (S170); otherwise, the correlation value is increased by 1 (S180). Accordingly, a correlation value is decreased before the sum of input values reaches an accumulation value in each cell of the sign decision memory 405, and the correlation value begins to increase after the value of the sign decision memory 405 has become "0".

Then, a decision is made whether every cell of the sign decision memory 405 has been checked on (S190).

If every cell of the sign decision memory 405 has not been checked on, the next cell to be checked on is set (S195).

If every cell of the sign memory has been checked on, a decision is made whether calculation is completed up to the last pixel of the current line (S197).

If calculation is not completed up to the last pixel of the current line, the next pixel is set in order to return to the step of extracting a horizontal edge (S199).

If calculation is completed up to the last pixel of the current line, a decision is made whether calculation is completed up to the last line (S200).

If calculation is not completed up to the last line, the next line is set in order to return to the step (S110) of setting up the sign decision memory 405 (S205).

Finally, if calculation is completed up to the last line, the minimum value is detected out of correlation values in the vertical correlation arithmetic unit 406, and a vertical motion vector is output (S210).

To explain in detail, according to whether or not every cell of the sign decision memory has been checked on (S190), and whether or not calculation is completed up to the last line (S200), whenever each pixel is input, comparison and addition or subtraction is carried out successively for ($2S_v+1$) cells of the sign decision memory 405 and ($2S_v+1$) correlation values $C_v(v)(-S_v \leq v \leq S_v)$.

If the calculation of correlation is completed for a line y, every cell of the sign decision memory 405 is reset (one-line reset). Then, $P'_v(y-S_v+1)$ $P'_v(y+S_v+1)$, the values of the cells of the vertical line memory within the next searching area, are loaded to the sign decision memory 405 and accumulated into the vertical correlation arithmetic unit 406, and the calculation of correlation is carried out for a line (y+1).

Further, between the step of deciding whether calculation is completed up to the last pixel of the current line and the step of deciding whether calculation is completed up to the last line, the image data of a line y (the current image data) is accumulated into the one-line accumulator 402 to be used for detecting a motion vector of the next field. The data is held for a period during which lines corresponding to half a searching area are scanned, then replaces the old data $P'_v(y-S_v)$ in the vertical line memory 404. By these successive operations, correlation values are calculated successively for all the lines $\{y|S_v<y<M-S_v\}$ except upper and lower searching margins, and the data of the vertical line memory is renewed.

If all the lines have been scanned in such a way, correlation values corresponding to the length of a searching area are obtained so that the displacement v of the minimum value, min $\{CV(v)\}$, among those correlation values can be determined to be a vertical motion vector v.

Second, a method for detecting a horizontal motion vector is described in conjunction with relevant equations and with a device for detecting a motion vector.

The following equation (8) can substitute for the equation (1) of calculating a correlation value.

$$C_H(u) = \sum_{x=S_H}^{M-S_H} |P'_H(x+u) - \sum_{y=0}^{N-1} E_y(x,y)| \quad (5)$$

In the equation, $u\{u|-S_H \leq u \leq S_H\}$ is an integer within a searching area $\pm S_H$, and it represents a displacement variable. A displacement variable u for the minimum value of $C_H(u)$ becomes the optimum motion vector. $E_y(x,y)$ is a vertical edge at the coordinates (x, y). To integrate or accumulate $E_y(x, y)$ from y=0 to y=N-1, it will be $P_H(x)$, that is, an accumulation value in a vertical line through the coordinates (x, y) (referred to as a line x hereinafter). In other words, a correlation value between the preceding and present field images in a line x is the absolute value of a difference between the line integration value of $E_y(x,y)$ of the present field and an accumulation value $P'_H(x+u)$ of the preceding field. Thus, if the line integration value is less than the accumulation value of the preceding field, a subtracted value from the accumulation value is a correlation value; otherwise, an excess value over the accumulation value is a correlation value in a line x.

The equation (8) can be expressed like the following one.

$$C_H(u) = \sum_{x=S_H}^{M-S_H} \left( P'_H(x+u) - \sum_{y=0}^{n-1} E_y(x,y) + \sum_{y=n}^{N-1} E_y(x,y) \right) \quad (9)$$

In the equation, a threshold value n is an integer that meets the following equation (10).

$$\sum_{y=0}^{n-1} E_y(x,y) = P'_H(x+u), (0 < n < N) \quad (10)$$

If there is no integer that meets the equation (10), N is used instead. Consequently, when the second term on the right side of the equation (8) is less than the accumulation value $P'_H(x+u)$ of the preceding field, the third term on the right side of equation (9) will be 0. However, when the second term on the right side of equation (8) is equal to or greater than the accumulation value of the preceding field, a correlation value in a line x will be the absolute value of a difference between the first and second terms on the right side of equation (8).

When a scan is completed for a field image, correlation values corresponding to a searching area are calculated so that the location of the minimum value or the displacement from the center can be determined to be a displacement quantity or motion vector. However, since the direction of the integration of the second and third terms on the right side of equation (9), that is, a vertical direction, is not in accordance with the scanning direction, line memories are required for storing the current accumulation data.

In practical application, however, an image is vertically divided into $1 \sim N_s$ before calculating correlation values, in order to economize on horizontal line memories.

As shown in FIG. 4, a device for detecting a motion vector according to an embodiment of the present invention comprises a device for detecting a vertical motion vector 401~406 and a device for detecting a horizontal motion vector 407~411.

Assuming that the number of vertical division $N_s$ is 4, that is, an image is vertically divided into four, the device for detecting a horizontal motion vector 407~411 includes a vertical edge extractor 407, five (4+1) horizontal line memories 408 and 409 (720 cells * 6 bits) for accumulating an image, a comparator 410, and a horizontal correlation arithmetic unit 411 ((2$S_y$+1) cells * 16 bits).

The horizontal line memory of the above components refers to both the first horizontal line memory 408 and the second horizontal line memory 409. In order to economize on the first horizontal line memory 408, or the current image accumulation line memory, the second horizontal line memory 409 comprises several memories for storing an image divided into several divisions. The memory size of the first horizontal line memory 408 is the same as that of each memory or each division of the second horizontal line memory 409.

After correlation values have been determined in one division, partial-accumulation values of the present field stored in the first horizontal line memory 408 are loaded into one division of the second horizontal line memory 409 to be compared with the next field.

Figure 6:
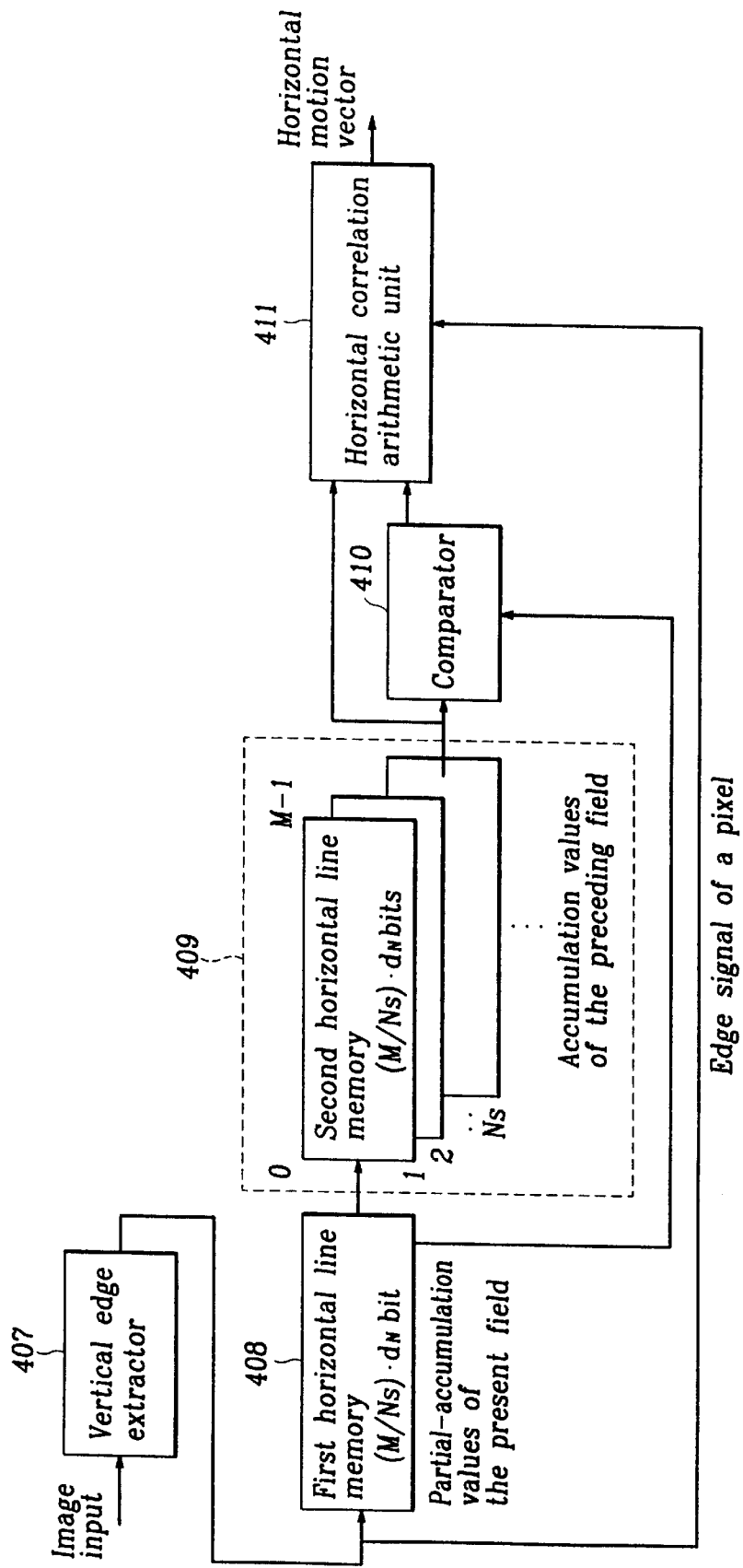
FIG. 6 is a conceptual diagram which shows a method for detecting a horizontal motion vector according to an embodiment of the present invention.

A method for detecting a horizontal motion vector will be described with reference to FIG. 6 and FIG. 7.

First, correlation values $C_H(u)$ in the horizontal correlation arithmetic unit 406 are initialized (S10).

The first horizontal line memory 408 is cleared (S15).

Before a partial image k (k=1,2, . . . ,$N_s$) is scanned, the kth accumulation values $P'_{Hk}(S_H+u)$ $P'_{Hk}(M-S_H+u)$ of the preceding field in the second horizontal line memory 409 are accumulated into the horizontal correlation arithmetic unit 411. The number of cells of correlation to be accumulated into in the horizontal correlation arithmetic unit 411 is 2$S_H$+1, the length of a searching area.

A vertical edge $E_y(x, y)$ is extracted through the vertical edge extractor 407 (S20).

The value of a pixel (a vertical edge) read through a line scan is accumulated into the partial-accumulation value $P_H(x)$ of the present field in the first horizontal line memory 408 (S30).

In the comparator 410, the partial-accumulation values of the present and preceding fields, respectively, in the first and second horizontal line memories 408 and 409 are compared (S40).

According to the output of the comparator 410, horizontal correlation values are increased or decreased in the horizontal correlation arithmetic unit 411 (S45).

To explain in detail, if the partial-accumulation value $P_H(x)$ of the present field is less than the partial-accumulation value $P'_{Hk}(x+u)$, a correlation value $C_H(u)$ is decreased by "1"; otherwise, the correlation value $C_H(u)$ is increased by "1". Accordingly, a correlation value, into which the kth partial-accumulation value of the preceding field is already added, is decreased until $P_H(x)$ reaches $P'_{Hk}(x+u)$, and the correlation value begins to increase after the current input value exceeds the accumulation value of the preceding field. Whenever each pixel is input, such comparison and addition or subtraction is carried out successively for (2$S_H$+1) correlation values $C_{H(u)}$ $_{(-SH}\leq u \leq S_H)$.

Next, the data of the second horizontal line memory 409 are renewed (S50), and a decision is made whether there is any image division left where correlation values are to be compared (S60).

If there is any image division left, the next division is set in order to return the step (S15) of clearing the first horizontal line memory 408 (S65).

If no image division is left, the minimum value out of the correlation values in the horizontal correlation arithmetic unit 411 is detected to output a horizontal motion vector (S70).

As shown above, since correlation values are calculated in each division, a line memory for storing the current accumulation data can be economized. Assuming that the divisor is $N_s$, the required memory is ($N_s$+1) memories of (M*$d_n$/$N_s$) bits, that is, the required memory size is ($N_s$+1)*(M*$d_N$/$N_s$) bits, while 2 line memories of M*$d_N$ bits, that is, the memory size of 2*M*$d_N$ bits are required when an image is not divided. Thus, the dividing method has ($N_s$+1)/2$N_s$ times the efficiency of the method of not dividing in using memory. However, since the larger a divisor $N_s$ is, the more a horizontal searching area is restricted, the divisor should be determined in due consideration of the characteristics of a camcorder (or a video camera).

In an embodiment of the present invention, an image is divided into 4 divisions, so that about 5/8, or 40 percent of memory is saved.

As described above, according to a preferred embodiment of the present invention, the following effects can be achieved.

First, directional edges are used to enhance the accuracy of a motion vector.

Second correlation values are calculated and renewed for every line, and a motion vector can be determined even for a partial image corresponding to lines for which a scan is completed, so that the partial motion vector can be used for some purpose.

Third, as soon as a scan is completed for a field image, correlation values are determined, so that a motion vector can be detected at a high speed.

Fourth, only 50 ~70 percent of vertical and horizontal line memories are used as compared with the method of using two pairs of line memories.

Finally, the calculation of correlation values is carried out by increasing or decreasing by few bits (1 bit in case of a binary image), so that a simple circuit is realized.

Accordingly, the present invention provides a device and method for detecting a motion vector of an image having the above effects. Also, the scope of the use of such effects is not restricted to a video camera, but can cover the whole field of cameras.

What is claimed is:

1. A device for detecting a motion vector of an image comprising:

a horizontal edge extractor which extracts and outputs horizontal edges from said input image;

a one-line accumulator which accumulates horizontal edges input from said horizontal edge extractor and outputs accumulated data corresponding to one line of pixels;

a delay register which holds said accumulated data input from said one-line accumulator for a predetermined time period before outputting said accumulated data;

a vertical line memory which stores accumulation data of a preceding field before replacing said accumulation data with said accumulated data input from said delay register;

a sign decision memory which stores data input from said vertical line memory and, from a value stored in every cell of said sign decision memory, subtracts a value input from said horizontal edge extractor to output subtracted values;

a vertical correlation arithmetic unit which holds correlation values and, according to said value input from each cell of said sign decision memory, performs one of an increase and a decrease in a corresponding correlation value to detect and output a vertical motion vector;

a vertical edge extractor which extracts and outputs vertical edges from said input image;

a first horizontal line memory which stores and outputs accumulation values of pixel data input from said vertical edge extractor;

a second horizontal line memory which dispersedly stores accumulation values of said preceding field and replaces said accumulation values with said accumulation values output from said first horizontal line memory;

a comparator which receives said accumulation values from said first horizontal line memory and from said second horizontal line memory and compares said accumulation values to output a comparison result; and a horizontal correlation arithmetic unit which holds correlation values and, according to a comparison result of said comparator, performs one of an increase and a decrease in the correlation values to detect and output a horizontal motion vector.

2. The device as claimed in claim 1, wherein said horizontal and vertical edge extractors each comprise an IIR filter to extract horizontal and vertical edges from said input image.

3. The device as claimed in claim 1, wherein said delay register holds said accumulated data, before outputting said accumulated data, for said predetermined time period during which half a searching area is scanned.

4. The device as claimed in claim 1, wherein said second horizontal line memory divides said image into several divisions in order to economize said first horizontal line memory which stores current accumulation data.

5. A method for detecting a vertical motion vector of an image comprising the steps of:

storing, in a sign decision memory, accumulation values corresponding to a preceding field within a searching area;

preloading correlation values, into a vertical correlation arithmetic unit, which correspond to said preceding field;

extracting a horizontal edge of said image;

determining whether a horizontal edge has been extracted;

decreasing, when a horizontal edge has been extracted, a value of every cell of the sign decision memory by a predetermined value;

determining whether the value of a cell of the sign decision memory is positive;

decreasing a correlation value by a predetermined amount when the value of a corresponding cell of the sign decision memory is positive;

increasing a correlation value by a predetermined amount when the value of the corresponding cell of the sign decision memory is not positive;

determining whether every cell of the sign decision memory has been checked;

determining whether calculation is completed up to the final pixel of the current line when every cell of the sign memory has been checked;

determining whether, calculation is completed up to the last line when calculation is completed up to the last pixel of the current line; and detecting a minimum value of the correlation values to output a vertical motion vector when calculation is completed up to the last line.

6. The method as claimed in claim 5, further comprising the steps of:

determining, when no horizontal edge is extracted, whether calculation is completed up to a final pixel of a current line;

repeating the step of detecting a horizontal edge when calculation is not completed up to the last pixel of the current line; and setting the next line to return to the step of setting up the sign decision memory when calculation is not completed up to the last line.

7. The method as claimed in claim 5, further comprising the step of setting a next cell to be checked when every cell of the sign decision memory has not been checked.

8. The method as claimed in claim 5, wherein between the step of determining whether calculation is completed up to the last pixel of the current line and the step of determining whether calculation is completed up to the last line, is further included the step of replacing the image data of the vertical line memory with present image data to be used in detecting a motion vector of a next field, after a time during which half a searching area is scanned.

9. A method for detecting a horizontal motion vector of an image comprising the steps of:

initializing correlation values in a horizontal correlation arithmetic unit;

extracting a vertical edge from said image;

accumulating a partial-accumulation value of a present field into a first horizontal line memory;

comparing accumulation values stored in the first horizontal line memory with accumulation values of a preceding field stored in a second horizontal line memory;

perform an increase or decrease in said correlation values in accordance with a result of said comparing step;

renewing data of the second horizontal line memory;

determining whether there is a portion of said image where correlation values are to be compared;

setting the next portion of said image to return to the step of clearing the first horizontal line memory when there is a portion of said image where correlation values are to be compared; and detecting a minimum value out of the correlation values to output a horizontal motion vector when there is no portion of said image where correlation values are to be compared.

10. The method as claimed in claim 9, further comprising the step of clearing a first horizontal line memory before said step of extracting a horizontal edge.

11. The method as claimed in claim 9, wherein in the step of renewing the data of the second horizontal line memory, the partial-accumulation values of the present field stored in the first horizontal line memory are stored in one division of the second horizontal line memory to be compared with the next field, after correlation values are determined in one division.

* * * * *